US011100156B2

(12) United States Patent
Klausner

(10) Patent No.: US 11,100,156 B2
(45) Date of Patent: Aug. 24, 2021

(54) SYSTEM AND METHOD FOR DETERMINING AN ORIGIN OF AND IDENTIFYING A GROUP FOR DIGITAL CONTENT ITEMS

(71) Applicant: David Klausner, Redwood, CA (US)

(72) Inventor: David Klausner, Redwood, CA (US)

(*) Notice: Subject to any disclaimer, the term of this patent is extended or adjusted under 35 U.S.C. 154(b) by 428 days.

(21) Appl. No.: 15/187,088

(22) Filed: Jun. 20, 2016

(65) Prior Publication Data

US 2017/0364578 A1 Dec. 21, 2017

(51) Int. Cl.
*G06F 16/43* (2019.01)

(52) U.S. Cl.
CPC .................................... *G06F 16/43* (2019.01)

(58) Field of Classification Search
CPC ......... G06F 17/30598; G06F 17/30604; G06F 16/43
USPC .......................................................... 707/737
See application file for complete search history.

(56) References Cited

U.S. PATENT DOCUMENTS 7,664,763 B1 * 2/2010 Russell ................... H03M 7/30 707/641
2006/0230014 A1 * 10/2006 Kedem ................. G06F 3/0605
2008/0256093 A1 * 10/2008 Amitay ................... G06F 16/35
2013/0006948 A1 * 1/2013 Shmueli ................ G06F 16/185 707/693
2014/0201175 A1 * 7/2014 Ohno .................. G06F 16/1744 707/693
2015/0169562 A1 * 6/2015 Connor ............ G06F 17/30705 707/723
2016/0127746 A1 * 5/2016 Maurer .................. H04N 19/65 382/232
2016/0216900 A1 * 7/2016 Satou .................... G06F 3/0616

OTHER PUBLICATIONS

"In Search for Volta: Statistical Analysis of Word Patterns in Shakespeare's Sonnets" Kohonen et al., Neural Networks Research Centre, Helsinki University of Technology, Department of Comparative Literature, Institute for Art Research, University of Helsinki, Proceedings of AMKLC '05, International Symposium on Adaptive Models of Knowledge, Language and Cognition, pp. 44-47, 2005, 4 pages.

(Continued)

*Primary Examiner* — Kimberly L Wilson
(74) *Attorney, Agent, or Firm* — Ziegler IP Law Group, LLC

(57) ABSTRACT

Disclosed is a method for identifying a group for digital content items. The method includes (a) retrieving one or more digital content item, (b) determining at least one characteristic of each digital content item, (c) transforming, with a first transformation method, the determined one or more digital content item to form one or more transformed digital content item, (d) determining at least one characteristic of the one or more digital content item, (e) assessing the determined at least one characteristic of the one or more digital content item with respective at least one characteristic of the one or more transformed digital content item to form a first transformation assessment result, and (f) using the first transformation assessment result to determine a group for the one or more digital content item.

71 Claims, 19 Drawing Sheets

A

DETERMINING AT LEAST ONE CHARACTERISTIC OF THE TRANSFORMED DIGITAL CONTENT ITEM — 708

ASSESSING SAID DETERMINED AT LEAST ONE CHARACTERISTIC OF THE ONE OR MORE DIGITAL CONTENT ITEM WITH RESPECTIVE AT LEAST ONE CHARACTERISTIC OF THE ONE OR MORE TRANSFORMED DIGITAL CONTENT ITEM TO FORM A FIRST TRANSFORMATION ASSESSMENT RESULT — 710

USING THE FIRST TRANSFORMATION ASSESSMENT RESULT TO DETERMINE AN ORIGIN OF THE DIGITAL CONTENT ITEM BY COMPARING THE FIRST TRANSFORMATION ASSESSMENT RESULT OF THE DIGITAL CONTENT ITEM TO A TRANSFORMATION ASSESSMENT RESULT OF A DIGITAL CONTENT ITEM OF KNOWN ORIGIN OBTAINED USING THE FIRST TRANSFORMATION METHOD — 712

(56) References Cited

OTHER PUBLICATIONS

"Intellectual Property Protection in VLSI Designs: Copy Detection Mechanisms for IP Authentication" Publisher: Springer US, Copyright 2003, DOI 10.1007/0-306-48717-9_5, Print ISBN 978-0-306-48717-0, Copyright Holder: Springer Science + Business Media, Inc. pp. 117-158, 42 pages.

* cited by examiner

| Name of play / compression level | 1 | 2 | 3 | 4 | 5 |
|---|---|---|---|---|---|
| Comedy of Errors | 40.68% | 35.22% | 34.65% | 26.15% | 26.21% |
| Merry Wives of Windsor | 40.97% | 34.99% | 34.41% | 26.01% | 26.03% |
| Richard III | 41.39% | 34.64% | 34.06% | 25.52% | 25.58% |
| Two Gentlemen of Verona | 41.41% | 35.63% | 35.03% | 26.44% | 26.51% |
| Much Ado About Nothing | 41.63% | 35.63% | 35.05% | 26.31% | 26.37% |
| Julius Caeser | 41.97% | 35.86% | 35.26% | 26.47% | 26.53% |
| Love's Labour's Lost | 41.98% | 36.43% | 35.84% | 27.37% | 27.42% |
| As You Like It | 42.05% | 36.05% | 35.50% | 27.08% | 27.11% |
| Measure for Measure | 42.08% | 35.83% | 35.24% | 26.45% | 26.54% |
| Henry VI, part 3 | 42.11% | 35.33% | 34.72% | 25.99% | 26.03% |
| Taming of the Shrew | 42.16% | 36.01% | 35.42% | 26.77% | 26.83% |

| | | | | | |
|---|---|---|---|---|---|
| Twelfth Night | 42.29% | 36.34% | 35.74% | 26.94% | 26.99% |
| Antony and Cleopatra | 42.42% | 35.92% | 35.24% | 26.19% | 26.29% |
| Henry IV, part 2 | 42.51% | 36.44% | 35.79% | 27.27% | 27.32% |
| Othello | 42.60% | 36.02% | 35.38% | 26.46% | 26.55% |
| All's Well That Ends Well | 42.71% | 36.42% | 35.80% | 27.02% | 27.07% |
| Merchant of Venice | 42.73% | 36.66% | 36.03% | 27.42% | 27.44% |
| Coriolanus | 42.73% | 35.97% | 35.38% | 26.30% | 26.39% |
| Richard II | 42.83% | 36.39% | 35.78% | 27.00% | 27.09% |
| Titus Andronicus | 42.86% | 36.58% | 35.92% | 27.07% | 27.11% |
| Hamlet | 42.86% | 36.30% | 35.61% | 26.84% | 26.91% |

B

| Troiles and Cressida | 42.94% | 36.65% | 36.02% | 27.21% | 27.27% |
|---|---|---|---|---|---|
| Henry IV, part 1 | 42.96% | 36.61% | 36.02% | 27.49% | 27.52% |
| Romeo and Juliet | 43.15% | 36.81% | 36.19% | 27.50% | 27.58% |
| Henry VI, part 2 | 43.22% | 36.61% | 35.96% | 27.26% | 27.34% |
| Timon of Athens | 43.25% | 37.42% | 36.77% | 27.75% | 27.82% |
| Henry VIII | 43.29% | 36.47% | 35.90% | 26.89% | 27.00% |
| Henry V | 43.33% | 37.19% | 36.56% | 28.18% | 28.23% |
| Pericles | 43.50% | 37.53% | 36.93% | 28.07% | 28.14% |
| King Lear | 43.62% | 37.01% | 36.35% | 27.28% | 27.36% |

| King John | 43.63% | 37.32% | 36.69% | 27.72% | 27.82% |
| --- | --- | --- | --- | --- | --- |
| Henry VI, part 1 | 43.68% | 36.96% | 36.31% | 27.40% | 27.49% |
| Midsummer Night's Dream | 43.70% | 38.08% | 37.49% | 28.81% | 28.87% |
| Macbeth | 43.86% | 37.83% | 37.25% | 28.21% | 28.29% |
| Winter's Tale | 44.10% | 37.49% | 36.82% | 27.82% | 27.94% |
| The Tempest | 44.13% | 38.37% | 37.75% | 28.80% | 28.88% |
| Cymbeline | 44.16% | 37.24% | 36.62% | 27.49% | 27.60% |
| | | | | | |
| Standard Deviation | 0.008674 | 0.008302 | 0.008202 | 0.007563 | 0.007598 |

FIG. 3D

| Name of play / compression level | 1 | 2 | 3 | 4 | 5 |
|---|---|---|---|---|---|
| Edward II | 41.11% | 38.45% | 37.93% | 30.94% | 30.96% |
| Tamburlaine, Part 1 | 42.02% | 39.20% | 38.70% | 31.52% | 31.54% |
| Tamburlaine, Part 2 | 42.05% | 39.53% | 39.09% | 32.34% | 32.34% |
| The Jew of Malta | 43.08% | 40.26% | 39.78% | 32.33% | 32.37% |

| | | | | | |
|---|---|---|---|---|---|
| The Massacre at Paris | 43.66% | 41.93% | 41.49% | 35.36% | 35.39% |
| Dido, Queen of Carthage | 44.24% | 41.58% | 41.09% | 32.92% | 32.99% |
| The Tragical History of DFaustus | 44.38% | 42.30% | 41.75% | 34.12% | 34.12% |
| | | | | | |
| Standard Deviation | 0.011505 | 0.013803 | 0.013782 | 0.014045 | 0.014051 |

FIG. 4B

| AUTHORS/ALGORITHMS | Z1 | Z2 | Z3 |
|---|---|---|---|
| A1 | 0,23 | 0,12 | 0,1 |
| A2 | 0,24 | 0,12 | 0,11 |
| A3 | 0,22 | 0,13 | 0,09 |
| B1 | 0,43 | 0,33 | 0,23 |
| B2 | 0,44 | 0,34 | 0,22 |
| B3 | 0,42 | 0,32 | 0,23 |
| C1 | 0,12 | 0,08 | 0,05 |
| C2 | 0,13 | 0,07 | 0,05 |
| C3 | 0,12 | 0,08 | 0,06 |

| AUTHORS/ALGORITHMS | Z4 | Z5 | Z6 |
| --- | --- | --- | --- |
| A1 | 0,23 | 0,12 | 0,1 |
| A2 | 0,24 | 0,12 | 0,11 |
| A3 | 0,22 | 0,13 | 0,09 |
| B1 | 0,23 | 0,33 | 0,23 |
| B2 | 0,24 | 0,34 | 0,22 |
| B3 | 0,22 | 0,32 | 0,23 |
| C1 | 0,23 | 0,08 | 0,12 |
| C2 | 0,24 | 0,07 | 0,12 |
| C3 | 0,22 | 0,08 | 0,13 |

| | | | | | |
|---|---|---|---|---|---|
| 0,23 | 0,12 | 0,1 | 0,23 | 0,12 | 0,1 |
| 0,24 | 0,12 | 0,11 | 0,24 | 0,12 | 0,11 |
| 0,22 | 0,13 | 0,09 | 0,22 | 0,13 | 0,09 |

B=

| | | | | | |
|---|---|---|---|---|---|
| 0,43 | 0,33 | 0,23 | 0,23 | 0,33 | 0,23 |
| 0,44 | 0,34 | 0,22 | 0,24 | 0,34 | 0,22 |
| 0,42 | 0,32 | 0,23 | 0,22 | 0,32 | 0,23 |

C=

| | | | | | |
|---|---|---|---|---|---|
| 0,12 | 0,08 | 0,05 | 0,23 | 0,08 | 0,12 |
| 0,13 | 0,07 | 0,05 | 0,24 | 0,07 | 0,12 |
| 0,12 | 0,08 | 0,06 | 0,22 | 0,08 | 0,13 |

SYSTEM AND METHOD FOR DETERMINING AN ORIGIN OF AND IDENTIFYING A GROUP FOR DIGITAL CONTENT ITEMS

TECHNICAL FIELD

The present disclosure relates generally to pattern recognition and identification of digital content, and more specifically, to a system and method for determining an origin of digital content items and for determining a group for digital content items.

BACKGROUND

Digital content items include digital representations of content, such as, representations of images, music, video, documents, and the like in files and otherwise (e.g., streams). Such files can be stored in an electronic format, for example, Joint Photographic Expert Group (JPEG), Audio Video Interleave (AVI), Portable Document Format (PDF), Text File (TXT), Word Document (DOC), Moving Picture Expert Group (MPEG), Advance Audio Coding (AAC), Compressed File format such as ZIP, Hyper Text Markup Language (HTML), script, and the like, and transferred electronically, for example, from one data storage device to another, through electronic mail, file transfer, and the like. There are many existing methods available through which digital content items can be identified. One such method is for people/users to examine and analyze the digital content items by use of their senses. This ability of users to perform pattern recognition through their senses allows the users to determine, to a limited extent, when digital content items are forgeries, and when digital content items are subject to copyright and to trademark infringements, etc. However, the analysis of the digital content items by users is sometimes cumbersome and impractical when there are a large number of digital content items/electronic data. Further, users find it difficult to compare a large number of the digital content items to other digital content items to determine the probability and extent of the digital content items being similar or dissimilar when the digital content items are analyzed manually. Further, manual content identification methods are subjective, and may vary from person to person, and from expert to expert, thus reducing accuracy of identification.

Therefore, in light of the foregoing discussion, there exists a need to overcome the aforementioned drawbacks in existing approaches for identifying digital content items, including to determine the probabilities and extent of similarity, by using a more objective approach.

SUMMARY

The present disclosure seeks to provide a method for identifying a group for digital content items. The method comprises steps of: (a) retrieving one or more digital content item, (b) determining at least one characteristic of each digital content item, (c) transforming, with a first transformation method, said determined one or more digital content item to form one or more transformed digital content item, (d) determining at least one characteristic of said one or more transformed digital content item, (e) assessing said determined at least one characteristic of said one or more digital content item with respective at least one characteristic of said one or more transformed digital content item to form a first transformation assessment result, and (f) using said first transformation assessment result to determine a group for said one or more digital content item.

The present disclosure seeks to provide a method for determining an origin of a digital content item. The method comprises steps of: (a) retrieving a digital content item, (b) determining at least one characteristic of the digital content item, (c) transforming the digital content item to form a transformed digital content item using a first transformation method, (d) determining at least one characteristic of the transformed digital content item, (e) assessing said determined at least one characteristic of said one or more digital content item with respective at least one characteristic of said one or more transformed digital content item to form a first transformation assessment result, and (f) using said first transformation assessment result to determine an origin of the digital content item by comparing the transformation assessment result of the digital content item to a transformation assessment result of a digital content of known origin obtained using the first transformation method as explained below.

The present disclosure seeks to provide a system for determining an origin of a first digital content item. The system comprises a first storage for storing a transformation assessment result of said first digital content item and corresponding at least one identified origin of said digital content item, and a device for uploading a second digital content item to a service for determining a transformation assessment result of said second digital content item and determining a relationship between said transformation assessment result with the transformation assessment result of said first storage to determine an origin of said second digital content item.

Embodiments of the present disclosure substantially eliminate or at least partially address the aforementioned problems in the prior art, and enable transforming the digital content items using computerized methods and apparatuses to determine the probabilities of similarity.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure, and as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 3A-3D are tabular views that illustrate the transformation assessment storage of FIG. 1 that includes a plurality of digital content items and their corresponding transformation assessment results using a plurality of transformation methods for a first digital content item of known origin in accordance with an embodiment of the present disclosure;

FIGS. 4A-4B are tabular views that illustrate the transformation assessment storage of FIG. 1 that includes a plurality of digital content items and their corresponding transformation assessment results using a plurality of transformation methods for a second digital content item of known origin in accordance with an embodiment of the present disclosure;

FIG. 5B is a tabular view that illustrates a second plurality of transformation assessment results obtained using a second set of transformation methods for digital content items by a plurality of origins to identify a group for the digital content items by origin, in accordance with an embodiment of the present disclosure FIG. 5C is an exemplary view that illustrates a plurality of matrices of transformation assessment values for a plurality of transformation methods for a plurality of origins, in accordance with an embodiment of the present disclosure;

Figure 1:
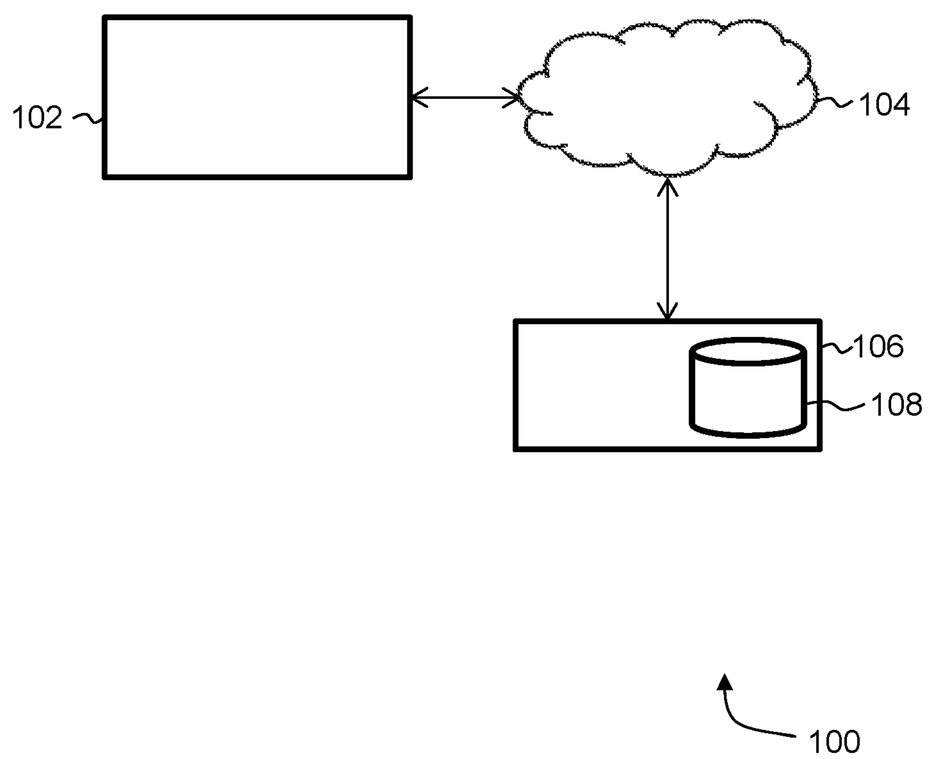
FIG. 1 is a schematic illustration of a user device communicating with a digital content transformation server through a network, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or for practicing the present disclosure are also possible. For examples, embodiments may be created using software, or using a Field Programmable Gate Arrays (FPGA(s)), or by using an Application Specific Integrated Circuits (ASIC(s)).

In one aspect, a method for identifying a group for digital content items is provided. The method comprises steps of: (a) retrieving one or more digital content item, (b) determining at least one characteristic of each digital content item, (c) transforming, with a first transformation method, said determined one or more digital content item to form one or more transformed digital content item, (d) determining at least one characteristic of said one or more digital content item, (e) assessing said determined at least one characteristic of said one or more digital content item with respective at least one characteristic of said one or more transformed digital content item to form a first transformation assessment result, and (f) using said first transformation assessment result to determine a group for said one or more digital content item.

In an embodiment, the method further comprises determining which of said one or more digital content items should be transformed.

According to one embodiment, the method is used for identifying a group for digital content items of a known origin and the transformation assessment result is related to said origin.

According to another embodiment, the transformation is done using a second transformation method different from the first transformation method for said one or more digital content item, to form a second transformation assessment result for said one or more digital content item.

According to another embodiment, the transformation is done using a third and optionally further transformation method different from the first and second transformation methods for said one or more digital content item, to form a third and optionally further transformation assessment result for said one or more digital content item.

According to another embodiment, the transformation method comprises compressing of said one or more digital content item with a compression algorithm.

According to another embodiment, the compression algorithm parameters vary between said first and optionally further transformation methods.

According to another embodiment, said one or more digital content item with transformation assessment results within a similar range belong to a similar group.

According to another embodiment, said transformation assessment result for said one or more digital content item are used in combination to determine a group for said one or more digital content item.

According to another embodiment, the at least one characteristic is a file size.

According to another embodiment, the assessing is calculating a ratio between a file size of the one or more transformed digital content item and a file size of the said one or more digital content item.

In another aspect, a method for determining an origin of a digital content item is provided. The method comprises steps of: (a) retrieving a digital content item, (b) determining at least one characteristic of the digital content item, (c) transforming the digital content item to form a transformed digital content item using a first transformation method, (d) determining at least one characteristic of the transformed digital content item, (e) assessing said determined at least one characteristic of said one or more digital content item with respective at least one characteristic of said one or more transformed digital content item to form a first transformation assessment result, and (f) using said first transformation assessment result to determine an origin of the digital content item by comparing the transformation assessment result of the digital content item to a transformation assessment result of a digital content item of known origin obtained using the first transformation method.

In an embodiment, the comparing said transformation assessment result of one or more digital content item to a transformation assessment result of the digital content item of known origin comprises comparing a second and optionally further transformation assessment result of the digital content item to a second and optionally further transformation assessment result of the digital content item of known origin obtained using the second and optionally further transformation method.

According to one embodiment, the digital content item is a form of text.

According to another embodiment, the digital content item is a form of software.

In another aspect, a system for determining an origin of a first digital content item is provided. The system comprises a first storage for storing a transformation assessment result of said first digital content item and corresponding at least one identified origin of said digital content item, and a device for uploading a second digital content item to a service for determining a transformation assessment result of said second digital content item and determining a relationship between said transformation assessment result with the transformation assessment result of said first storage to determine an origin of said second digital content item.

In an embodiment, the system and method determine a probability of two sets of digital content items being similar or dissimilar, or being copied from each other, or being created by a same author.

According to another embodiment, the system and method determine a probability of the identification of the digital content items.

According to another embodiment, the system and method receive queries and provide answers to the queries based on the determined probability of the identification of the digital content items.

According to another embodiment, the system includes the device (e.g., a user device), a network, a digital content transformation server, and transformation assessment storage (e.g., a file, or a database, etc.)

According to another embodiment, the user device may be a desktop, a mobile phone, a smart phone, a tablet, a personal computer, or an electronic notebook, etc. The user device is connected to the digital content transformation server through the network. The user device may upload one or more digital content items to analyze a degree of similarity of the one or more digital content items using the digital content transformation server. The user device may display the degree of the similarity of the one or more digital content items.

According to another embodiment, the storage or database (e.g., a file, or an internal or external database, etc.) stores the digital content items, and transformation assessment report for each of the digital content items, and an origin of one or more of the digital content items.

According to another embodiment, the digital content transformation server includes an internal file or database to store the one or more digital content items. The digital content transformation server performs a transformation on the one or more digital content items.

According to another embodiment, the digital content transformation server executes instructions to perform the transformation method on a first digital content item (e.g., an electronic copy of Shakespeare's "Romeo and Juliet",) to form a first transformed digital content item, and performs the same transformation method on a second digital content item (e.g., an electronic copy of Shakespeare's "Julius Caesar",) to form a second transformed digital content item. The transformation method may include, e.g., exporting, or converting (e.g., using Adobe Acrobat) the first digital content item or the second digital content item; or zipping the first digital content item, or the second digital content item by using a compaction (or compression) program such as Phil Katz ZIP compression program (PKZIP), Roshal Archive compression program (RAR), Windows (registered trademark) version of RAR (WinRAR), or Windows (registered trademark) version of ZIP compression technology (WinZip); or converting between data types or formats. The compaction program provides statistics on a degree of transformation/compaction of each digital content item, and may provide options for the degree of transformation/compaction to be performed. Transformation methods may also be used to form statistics.

According to an embodiment, the resulting statistics form a ratio between the first digital content item, and the second digital content item that are used to determine the degree of similarity. The resulting statistics may form a profile for each digital content item by varying the options of the transformation program.

According to another embodiment, the digital content transformation system comprises a digital content item origin determining module that determines an origin of the digital content item by comparing the transformation assessment result of the digital content item to a transformation assessment result of a digital content item of known origin obtained using the first transformation method.

According to another embodiment, the transformation includes compression, processing, and/or modifying of the digital content item. In addition to compression, other methods and tools for transformation and processing may be used as known to persons of ordinary skill in the art.

According to another embodiment, a compression ratio value (a ratio between a size of compressed file to a size of original file) is dependent on a selected compression algorithm.

According to another embodiment, the one or more digital content items are compressed based on encodings (e.g., Moving Pictures Expert Group, Advanced Audio Coding, Joint Photographic Experts group, or Portable Network Graphics, etc.)

According to another embodiment, the one or more digital content items are compressed based on algorithms (e.g., 7z, ZIP, and RAR). The user device executes the known algorithms to compress the one or more digital content items.

According to another embodiment, the compression algorithms may include options Z1 to Z6 that compress the one or more digital content items based on the RAR program. The compression algorithms represented by 0 (a fastest compression or a least compression) to 9 (a slowest compression or a maximum compression) may compress the digital content items by using the PKZIP program.

According to another embodiment, the system includes a software based system (that may include scripts), or a hardware based system, or a system that is a combination of software and hardware. The methods are performed using the system that are programmed, or by loading the software for execution on the system, such that the system executes the software to produce results.

The present disclosure can be applied to any electronic data. For example the embodiments can be used to analyze the origin of a software program or of executable code of the software program to determine a likely author or company. Embodiments can also be used to analyze HTML content of web sites to find likely correlations, detect copies, etc.

Embodiments of the present disclosure may be used to determine the probability of two sets of electronic data being similar or dissimilar, or having been copied from each other, or having been created by the same author. Embodiments may also be used to determine the probability that electronic data has been identified and attributed correctly. Embodiments may receive queries and provide answers to those queries based on the determined probability of the identification of electronic data.

DETAILED DESCRIPTION OF THE DRAWINGS

FIG. 1 is a schematic illustration 100 of a user device 102 communicating with a digital content transformation server 106 through a network 104, in accordance with an embodiment of the present disclosure. The schematic illustration 100 includes the user device 102, the network 104, and the digital content transformation server 106. The digital content transformation server 106 may include a transformation assessment storage 108 (e.g., a file, or a database, etc.) that stores a transformation assessment result of a digital content item and at least one identified origin of the digital content item. The user device 102 may be a desktop, a mobile phone, a smart phone, a tablet, a personal computer, electronic notebook, etc. The user device 102 communicates with the digital content transformation server 106 through the network 104.

The user device 102 may upload one or more digital content items to the digital content transformation server 106 to analyze a degree of similarity of the one or more digital content items. The user device 102 may display the degree of the similarity of the one or more digital content items based on characteristics of the digital content items, transformed characteristic of the digital content items, and transformation assessment results. The transformation assessment storage 108 stores the transformation assessment results of the digital content item and at least one identified origin of the digital content items. In an embodiment, the digital content transformation server 106 includes the transformation assessment storage 108 to store the one or more digital content items. In another embodiment, the transformation assessment storage 108 may be present in the user device 102 or in another device or server connected through the network 104. Item 108 may also be data stored in storage (temporary or persistent) in a way capable of being retrieved without that data being contained in a formal database.

The digital content transformation server 106 performs a transformation on a first digital content item to form a first transformed digital content item. The digital content transformation server 106 may perform the same transformation on a second digital content item to form a second transformed digital content item. The transformation may include a compaction or a compression (e.g., using PKZIP, RAR, WinRAR, or WinZip, etc.) that provides statistics on a degree of transformation/compaction of the each digital content item, and provides options for the degree of the transformation/compaction to be done. In an embodiment, the statistics form a ratio between the one or more digital content items that are used to determine the degree of similarity of the one or more digital content items.

Figure 2:
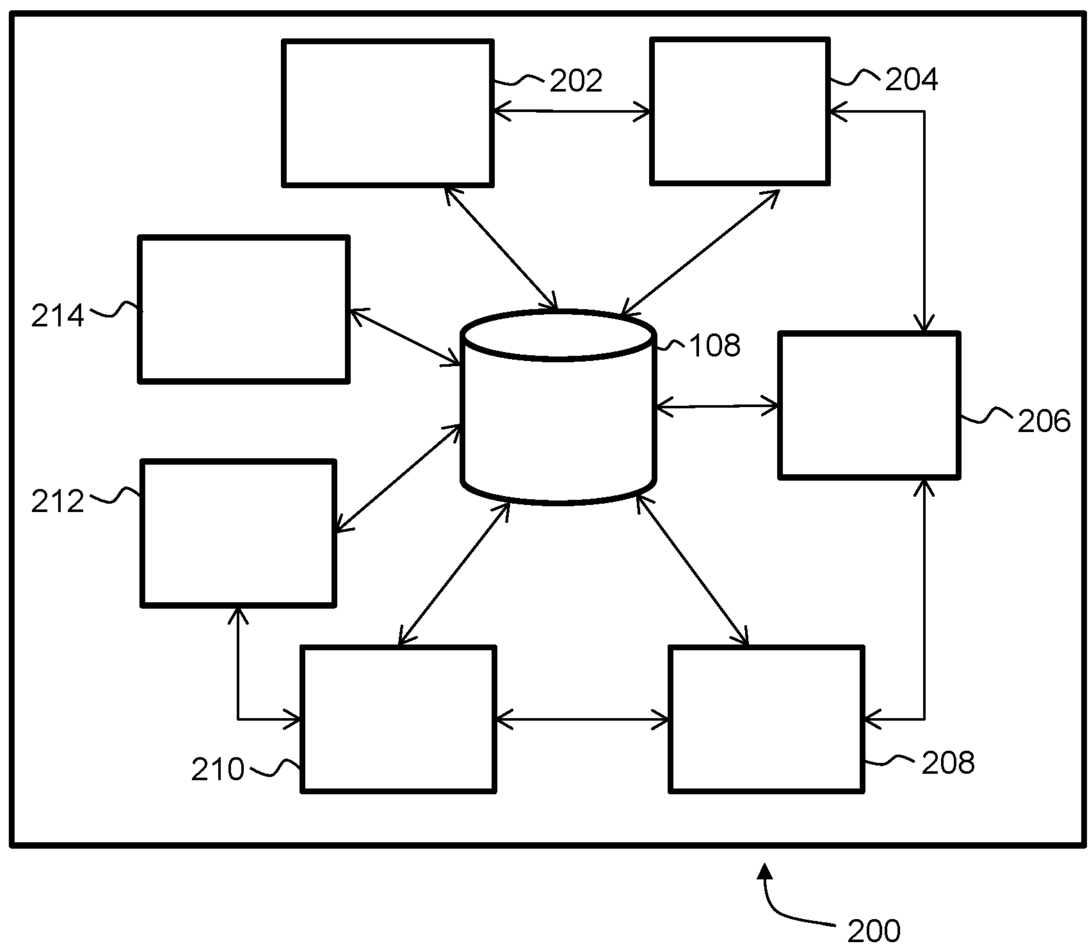
FIG. 2 is an exploded view of the digital content transformation server of FIG. 1, in accordance with an embodiment of the present disclosure.
Figure 3B:
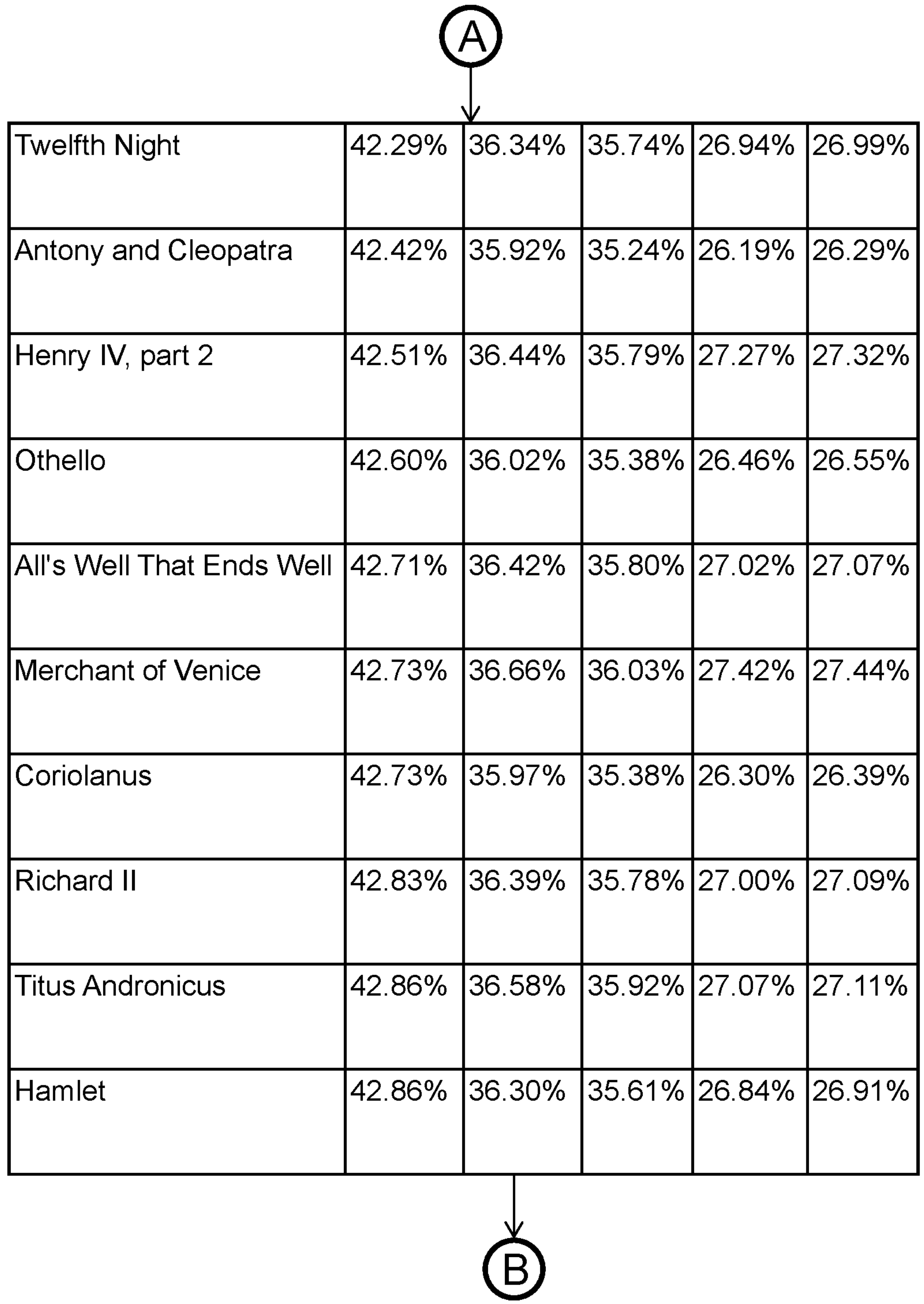

Referring to FIG. 2, illustrated is an exploded view 200 of the digital content transformation server 106 of FIG. 1, in accordance with an embodiment of the present disclosure. The exploded view 200 of the digital content transformation server 106 includes the transformation assessment storage 108, a characteristic determining module 202, a content transformation module 204, a transformation assessment result module 206, a group determining module 208, a content transformation identification module 210, an assessment range determining module 212, and a content origin determining module 214. The transformation assessment storage 108 stores a transformation assessment result of one or more digital content items, and a corresponding at least one identified origin of the one or more digital content items.

The characteristic determining module 202 determines at least one characteristic of the one or more digital content items (e.g., a file size of a digital content item). The content transformation module 204 performs a transformation on the one or more digital content items using one or more transformation methods to form one or more transformed digital content items. In an embodiment, the one or more transformation methods include at least one compression algorithm. For example, a first digital content item is transformed using a first compression algorithm. The characteristic determining module 202 further determines at least one characteristic of the one or more transformed digital content items. The transformation assessment result module 206 assesses the determined at least one characteristic of the one or more digital content items with respective at least one characteristic of the one or more transformed digital content items to form a transformation assessment result. In an embodiment, the assessment by transformation assessment result module 206 includes calculating a ratio between the file size of the one or more digital content items and the one or more transformed digital content items.

The group determining module 208 determines a group for the one or more digital content items using the transformation assessment result. The content transformation identification module 210 identifies which of the one or more digital content items should be transformed. The assessment range determining module 212 determines a range of values for the transformation assessment result. In an embodiment, the one or more digital content items with transformation assessment results within a similar range belong to a similar group. The content origin determining module 214 determines an origin of the one or more digital content items by comparing the transformed assessment result of the one or more digital content items to a transformed assessment result of a digital content item of known origin using a first transformation method. In an embodiment, the first transformation method includes the first compression algorithm. In another embodiment, an origin of one or more digital content items is determined based on one or more compression algorithms.

Referring to FIGS. 3A-3D, illustrated are tabular views that illustrate the transformation assessment storage 108 of FIG. 1 that includes a plurality of digital content items (e.g., plays) and their corresponding transformation assessment results using a plurality of transformation methods for a first play of known origin (e.g., authored by William Shakespeare), in accordance with an embodiment of the present disclosure. The tabular views 3A-3D include a list of plays of William Shakespeare (e.g., Comedy of Errors, Merry wives of Windsor, and Richard III, etc.) and a transformation assessment result (e.g., compression level of each of the plays of William Shakespeare.) At least one characteristic (e.g., a file size) of the plays is assessed with respect to the characteristic of the transformed (e.g., compressed) plays for a plurality of transformation methods (e.g., RAR compression algorithms z1 to z6 in increasing order of compression level). In an embodiment, a degree of compaction of William Shakespeare's plays varies from 40.68% to 44.16% with a standard deviation of less than 0.0087 for the lowest compression level (e.g., the compression level is 1).

William Shakespeare's words, sentences, and paragraphs are found to be different from each other to about eight and a half in 1000 across of all William Shakespeare's plays, and are identified as having an origin of William Shakespeare. This shows that his writing is consistent in plays that he is attributed to as author. Similarly, the result statistics suggest that when the plays of William Shakespeare that are identified to be at an extreme of the range of transformation and compaction (e.g. from a play "Comedy of errors" to a play "Cymbeline") are examined for different authorship, the result statistics indicate that all but one of William Shakespeare's comedies compacts less than that most of his tragedies, as shown in FIGS. 3A-3D. The degree of compaction of William Shakespeare's plays varies from 25.58% to 28.88% with the standard deviation of less than 0.0076 for the RAR compression level of 5. William Shakespeare's words, sentences, and paragraphs are different from each other to about seven and a half parts in 1000 across all of William Shakespeare's plays, and confirm that William Shakespeare is the author. The result statistics suggest the two more plays at an extreme of the range for further examination to evaluate the possibility of different authorship (e.g. from a play "Richard III" to a play "The Tempest").

Referring to FIGS. 4A-4B, illustrated are tabular views that show the transformation assessment storage 108 of FIG. 1 that includes a plurality of digital content items (e.g., plays) and their corresponding transformation assessment results using a plurality of transformation methods for a second play of known origin (e.g., authored by Christopher Marlowe), in accordance with an embodiment of the present disclosure. The tabular views include a list of names of plays of Christopher Marlowe (e.g., Edward II, Tamburlaine, Part 1, and Tamburlaine, Part 2, etc.) and a transformation assessment result (e.g., a RAR compression level) of each of the plays of Christopher Marlowe. The tabular views show that the degree of compaction of Christopher Marlowe's plays varies from 41.11% to 44.38% with the standard deviation of greater than 0.0115 when the RAR compression level is 1. Christopher Marlowe's words, sentences, and paragraphs are different from each other to about eleven and half parts in 1000 across all of his plays. The result statistics suggest that Christopher Marlowe is not the author of any of William Shakespeare's plays as shown in FIG. 4A. Although the play "As You Like It" transforms to the same 42.05% as a play of "Tamburlaine, Part 2" of Christopher Marlowe's at level 1, the result statistics are different at the level 5 (e.g. the play "As You Like It" includes the degree 27.11% and the play "Tamburlaine, Part 2" includes the degree 32.34%) that in turns indicates that the two plays include significant differences and and originate from different authors.

Figure 5A:
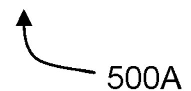
FIG. 5A is a tabular view that illustrates a first plurality of transformation assessment results obtained using a first set of transformation methods for digital content items by a plurality of origins to identify and/or group the digital content items by origin, in accordance with an embodiment of the present disclosure.

Referring to FIG. 5A, illustrated is a tabular view 500A that illustrates a first plurality of transformation assessment results obtained using a first set of transformation methods for digital content items from a plurality of origins (e.g., authors) to identify and/or group the digital content items by origin, in accordance with an embodiment of the present disclosure. The tabular view 500A includes a list of authors and algorithms. For example, the tabular view 500A includes the list of authors A, B, and C and includes a plurality of digital content items A1, A2, A3 by author A; B1, B2, B3 by author B; and C1, C2, and C3 by author C. The texts are compressed with the first set of transformation methods, such as RAR compression algorithms Z1, Z2, and Z3, according to an embodiment. The resulting compression ratios (e.g. ratio of the size of the compressed file to the size of the original file) are collected in the table as shown in FIG. 5A. The values corresponding to each of the authors within a range can be attributed to the listed author. Further, the compression values vary depending on the used compression method and/or algorithm. The compression values tend to group together in a range that indicates the author.

Referring to FIG. 5B, illustrated is a tabular view 500B that illustrates a second plurality of transformation assessment results obtained using a second set of transformation methods for digital content items from a plurality of origins (e.g., authors) to identify and/or group the digital content items by origin, in accordance with an embodiment of the present disclosure. The tabular view 500B includes the list of authors and the algorithms. For example, the tabular view 500B includes the list of authors A, B, and C, and includes texts of A1, A2, A3 by author A; B1, B2, B3 by author B; and C1, C2, and C3 by author C. The texts are compressed with the list of RAR algorithms Z4, Z5, and Z6. For example, the compression ratios with the RAR algorithm Z4 group to different authors who are relatively similar. The RAR algorithms Z5, and Z6 enable identifying a group for the authors since the transformation assessment results for different digital content items by the same author are within a similar range. The identification of a group of the authors may be accomplished by performing compression ratio comparisons with a plurality of compression algorithms.

Referring to FIG. 5C, illustrated is an exemplary view 500C that illustrates a plurality of matrices of transformation assessment values for a plurality of transformation methods for a plurality of origins A, B, and C, in accordance with an embodiment of the present disclosure. The transformation methods may include a plurality of RAR compression algorithms z1 to z6, according to an embodiment. In an embodiment, one or more mathematical methods such as eigenvalue analysis may be used to differentiate the matrices from each other.

Figure 6A:
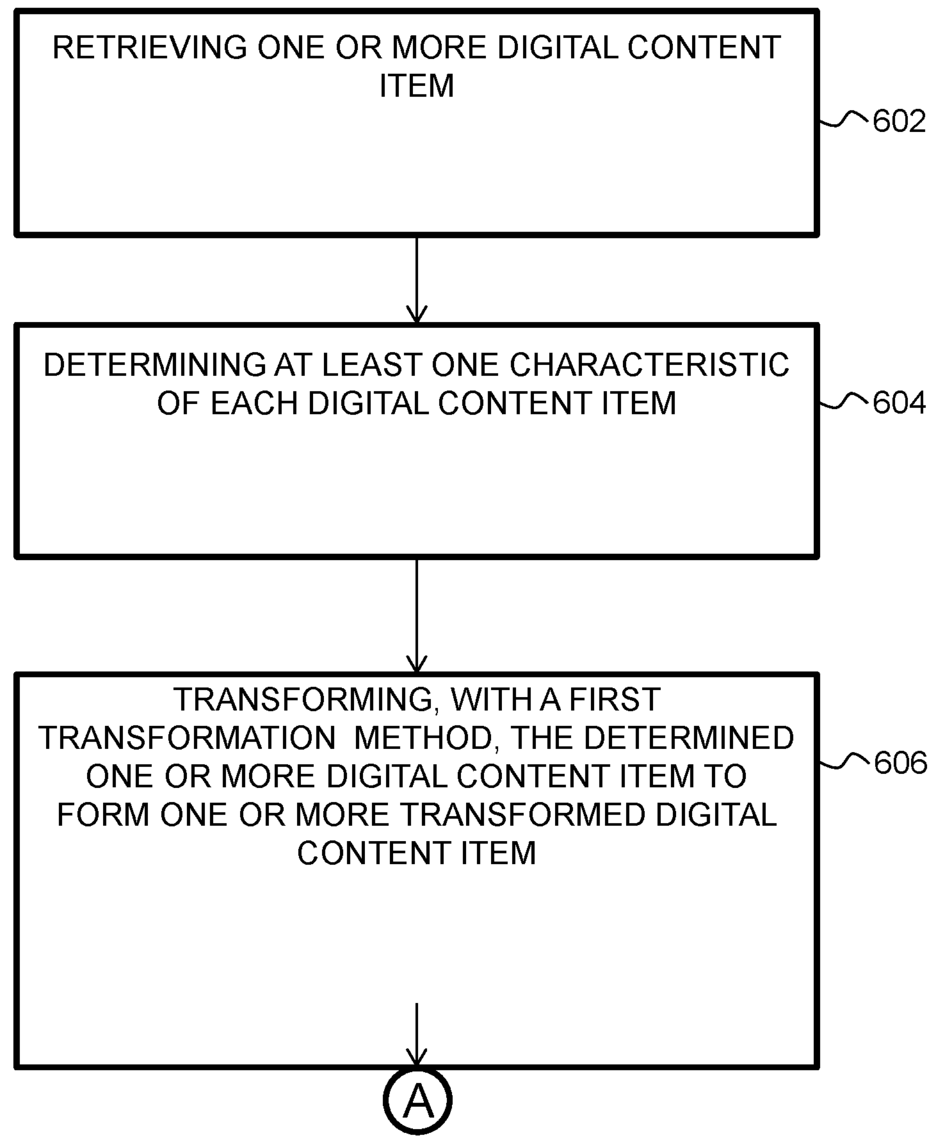
FIGS. 6A-6B are flow diagrams that illustrate a method for identifying a group for digital content items, in accordance with an embodiment of the present disclosure.
Figure 6B:
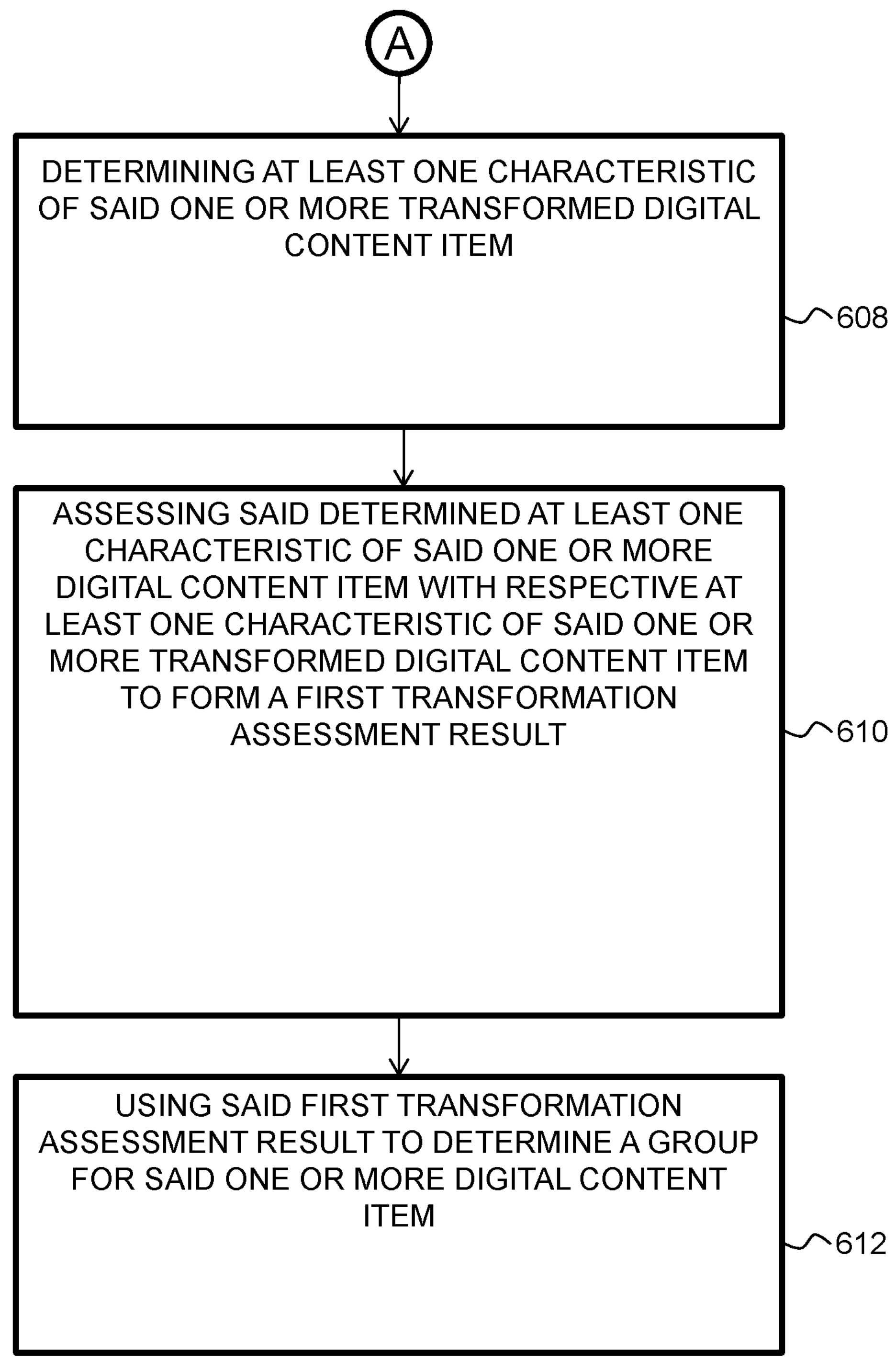

Referring to FIGS. 6A-6B, illustrated are flow diagrams that illustrates a method for identifying a group for the digital content items, in accordance with an embodiment of the present disclosure. At step 602, one or more digital content item is retrieved from transformation assessment storage 108. At step 604, at least one characteristic of each digital content item is determined. At step 606, the determined one or more digital content item is transformed to form one or more transformed digital content item using a first transformation method. At step 608, at least one characteristic of the one or more transformed digital content item is determined. At step 610, the determined at least one characteristic of the one or more digital content item is assessed with respective at least one characteristic of the one or more transformed digital content item to form a first transformation assessment result. At step 612, the first assessment result is used to determine a group for the one or more digital content item.

Figure 7A:
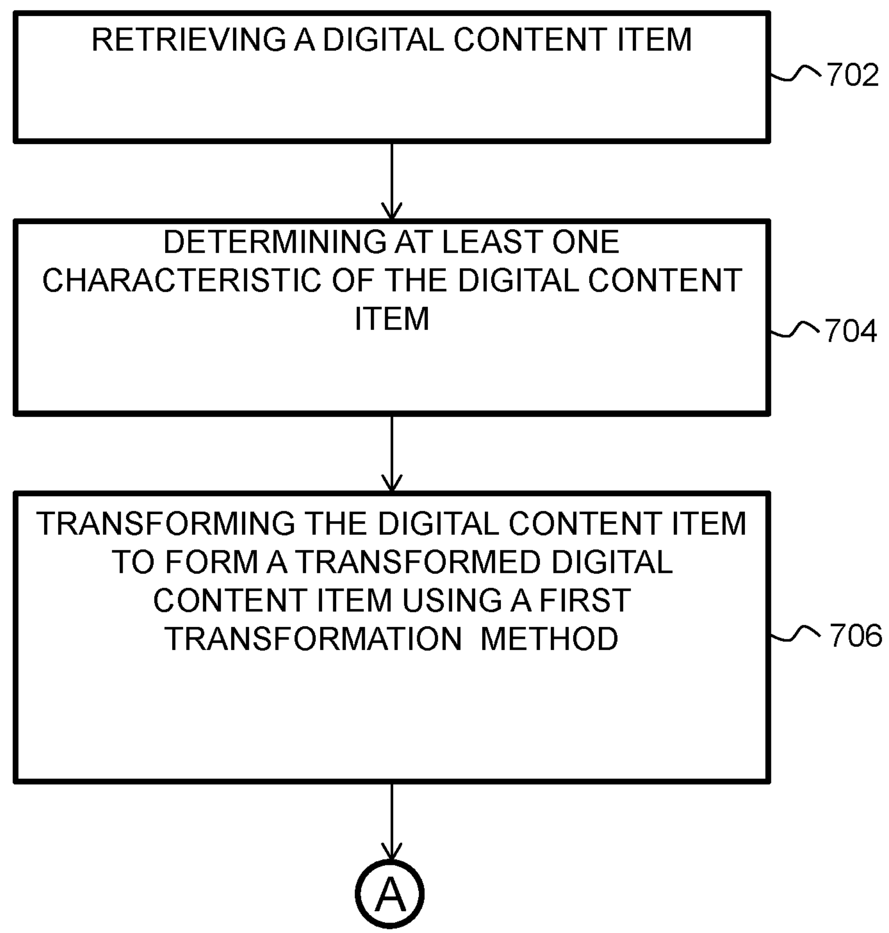
FIGS. 7A-7B are flow diagrams that illustrate a method for determining an origin of a digital content item, in accordance with an embodiment of the present disclosure.
Figure 7B:
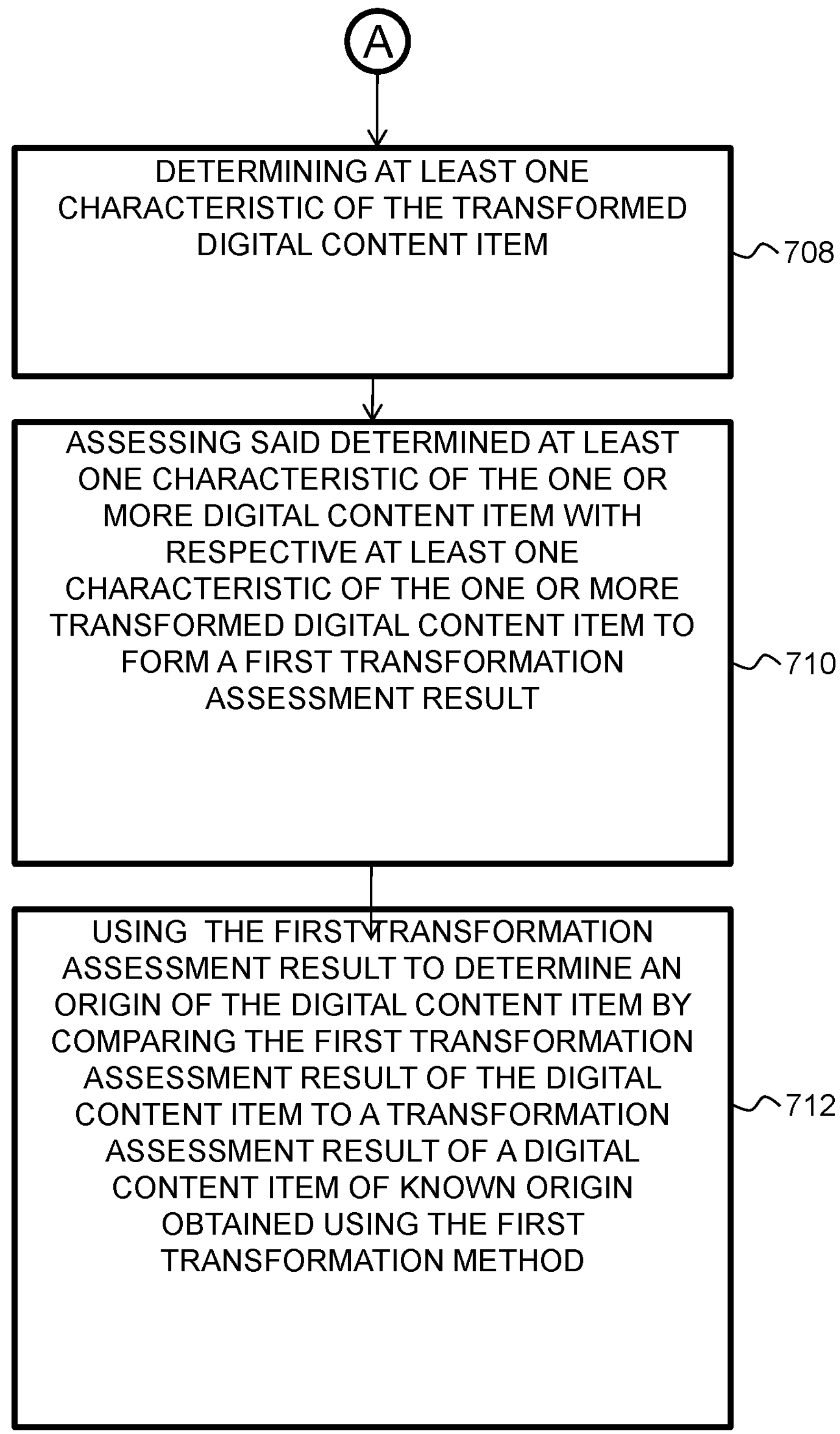

Referring to FIG. 7, illustrated is a flow diagram of a method for determining an origin of a digital content item, in accordance with an embodiment of the present disclosure. At step 702, a digital content item is retrieved from transformation assessment storage 108. At step 704, at least one characteristic of the digital content item is determined. At step 706, the digital content item is transformed to form a transformed digital content item using a first transformation method. At step 708, at least one characteristic of the transformed digital content item is determined. At step 710, the determined at least one characteristic of the one or more digital content item is assessed with respective at least one characteristic of the one or more transformed digital content item to form a first transformation assessment result. At step 712, the first transformation assessment result is used to determine an origin of the digital content item by comparing the transformation assessment result of the digital content item to a transformed assessment result of a digital content item of known origin obtained using the first transformation method.

Figure 8A:
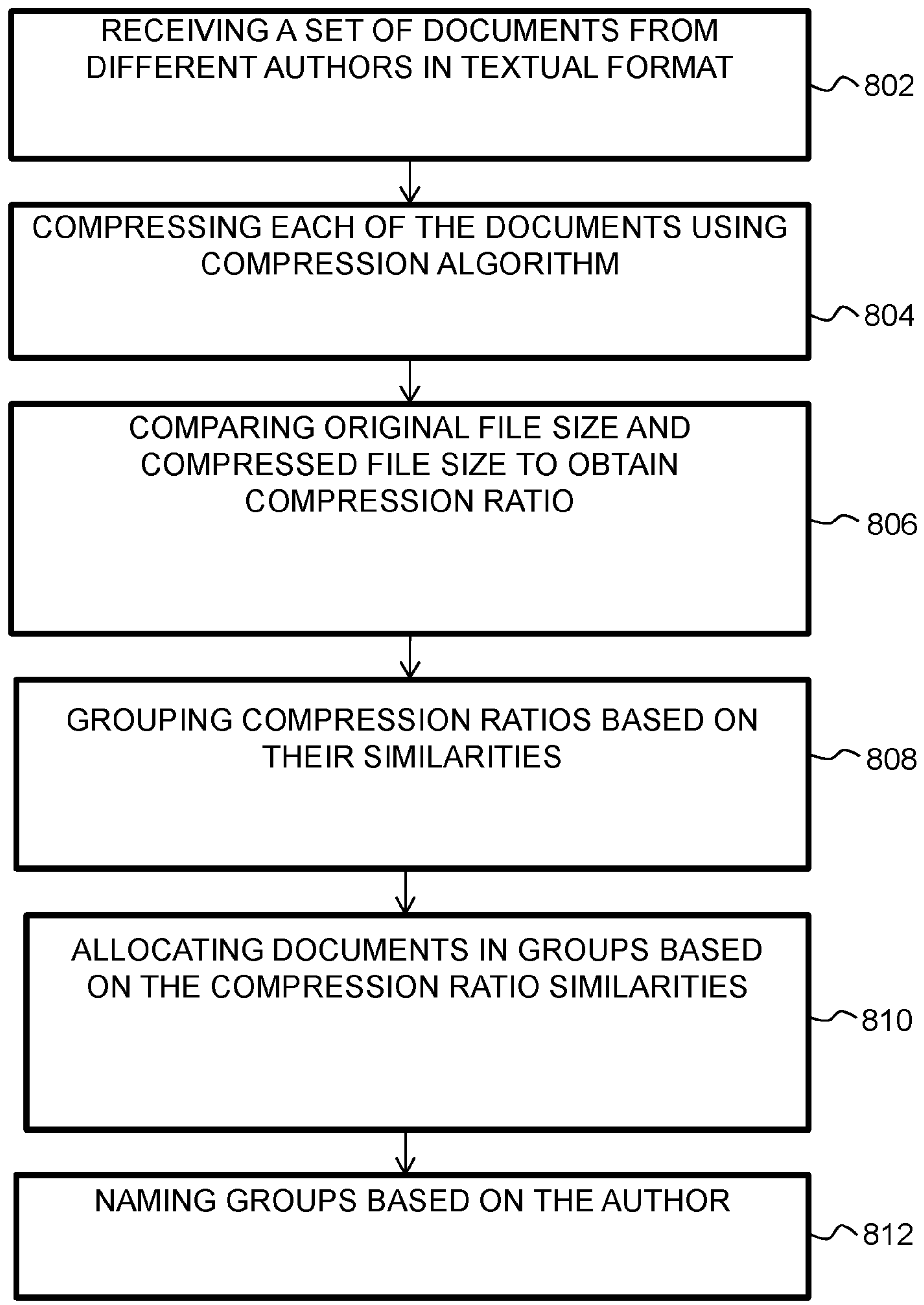
FIG. 8A is a flow diagram that illustrates a method for identifying a group for a set of digital content items based on an author, in accordance with an embodiment of the present disclosure.

Referring to FIG. 8A, illustrated is a flow diagram that illustrates a method for identifying a group for a set of digital content items based on an author, in accordance with an embodiment of the present disclosure. At step 802, a set of documents (e.g. one or more digital content item) is received from different authors in textual format. At step 804, each of the documents is compressed using a compression algorithm. At step 806, an original file size and a compressed file size are compared to obtain a compression ratio. At step 808, the compression ratios are grouped based on their similarities (e.g. which are within a range). At step 810, the documents are logically or physically grouped based on the compression ratio similarities. At step 812, the groups are named based on the author.

Figure 8B:
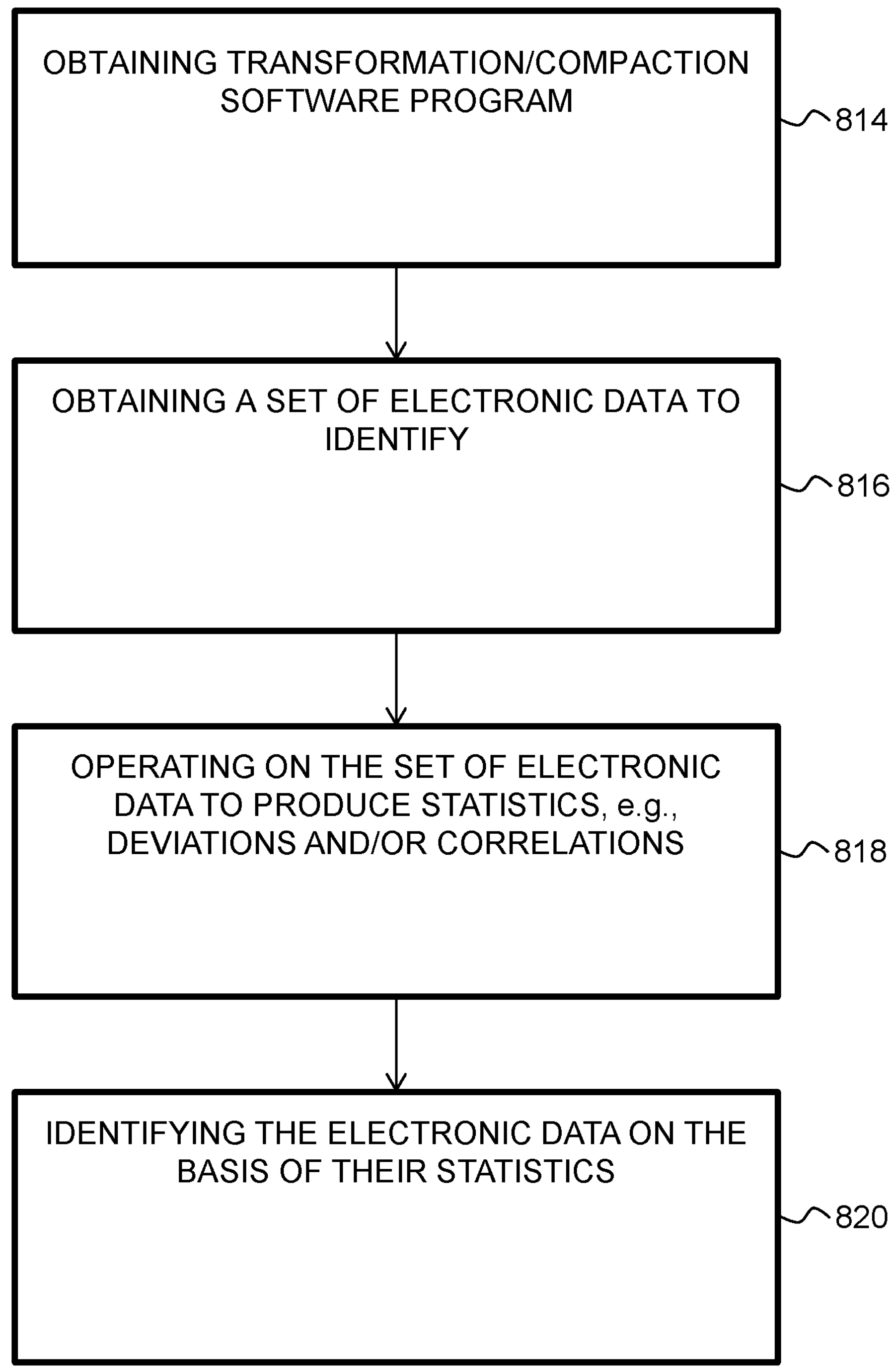
FIG. 8B is a flow diagram that illustrates a method for identifying a group for a set of digital content items using a digital content transformation system, in accordance with an embodiment of the present disclosure.

Referring to FIG. 8B, illustrated is a flow diagram that illustrates a method for identifying a group for a set of digital content items using a digital content transformation system 200, in accordance with an embodiment of the present disclosure. At step 814, a transformation software program is obtained. At step 816, a set of electronic data (e.g. one or more digital content item) is obtained for identification. At step 818, the set of electronic data is operated on to produce resulting statistics (e.g. deviations, and/or correlations). At step 820, the electronic data is identified on the basis of their statistics.

Figure 9:
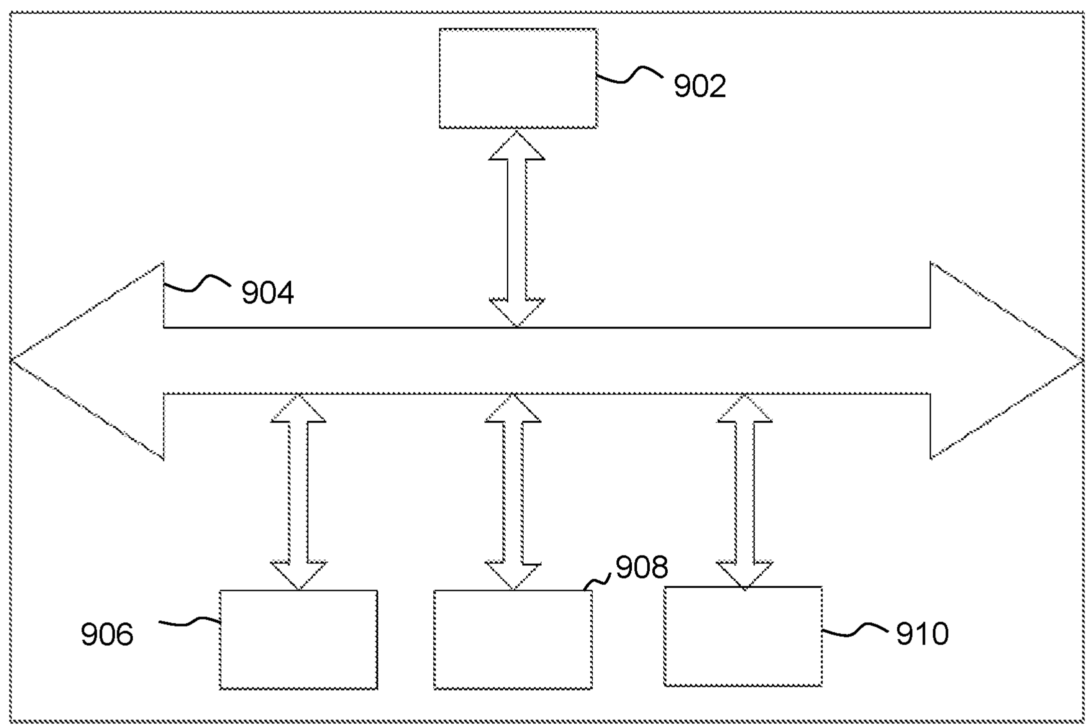
FIG. 9 is an exploded view of the receiver, in accordance with an embodiment of the present disclosure.

Referring to FIG. 9, illustrated is an exploded view of a receiver having a memory 902 having a set of instructions, a bus 904, a display 906, a speaker 908, and a processor 910 capable of processing the set of instructions to perform any one or more of the methodologies herein, according to an embodiment herein. The processor 910 may also enable digital content to be consumed in the form of video for output via one or more displays 906 or audio for output via speaker and/or earphones 908. The processor 910 may also carry out the methods described herein and in accordance with the embodiments herein.

Digital content may also be stored in the memory 902 for future processing or consumption. A user of the receiver may view this stored information on the display 906 and select an item of for viewing, listening, or other uses via input, which may take the form of keypad, scroll, or other input device(s) or combinations thereof. The content and stored information may be passed among functions within the receiver using the bus 904.

The embodiments herein can take the form of, an entirely hardware embodiment, an entirely software embodiment, or an embodiment including both hardware and software elements. The embodiments that are implemented in software include but are not limited to, firmware, resident software, microcode, scripts, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
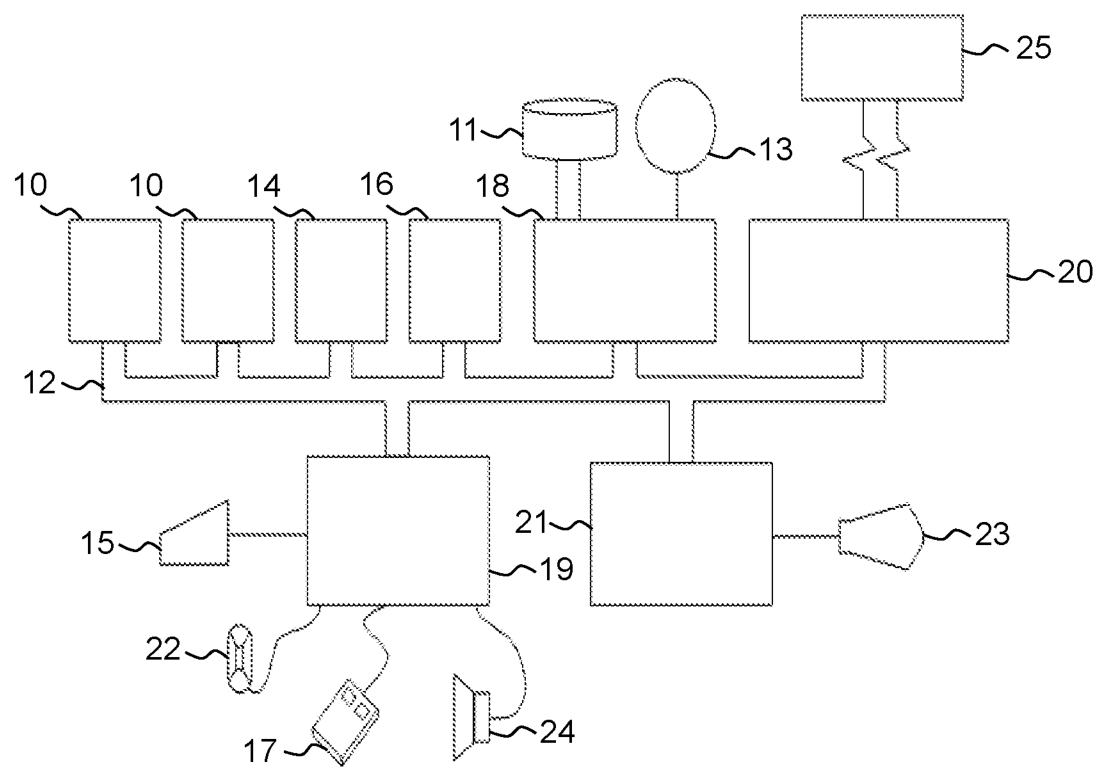
FIG. 10 illustrates a schematic diagram of computer architecture used to implement the digital content transformation server of FIG. 1, in accordance with an embodiment of the present disclosure.

A representative hardware environment for practicing the embodiments herein is depicted in FIG. 10. This schematic drawing illustrates a hardware configuration of a computer architecture/system used to implement the digital content transformation server 106 or the user device 102 of FIG. 1 in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for identifying a group of digital content items, the method comprising:
retrieving one or more digital content items;
determining at least one characteristic of the one or more digital content items;
transforming, with a first transformation method, said one or more digital content items to form one or more transformed digital content items;
determining at least one characteristic of said one or more transformed digital content items;
assessing said determined at least one characteristic of said one or more digital content items with respect to at least one characteristic of said one or more transformed digital content items to form a first transformation assessment result; and
using said first transformation assessment result to establish a group of one or more digital content items based on the assessment;
creating a table containing a first transformation assessment result, and
outputting to a display or to a printer a first transformation assessment result.

2. The method according to claim 1, wherein the method further comprises determining which of said one or more digital content items should be transformed.

3. The method according to claim 1, wherein the method further comprises identifying and grouping a group for digital content items of a known origin where the first transformation assessment result is related to said known origin.

4. The method according to claim 3, wherein transformation is done using a second transformation method different from the first transformation method for said one or more digital content items, to form a second transformation assessment result for said one or more digital content items.

5. The method according to claim 4, wherein transformation is done using a third and optionally further transformation method different from the first and second transformation methods for said one or more digital content items, to form a third transformation assessment result and optionally further transformation assessment result for said one or more digital content items.

6. The method according to claim 1, wherein the first transformation method is a non-compressing method.

7. The method according to claim 1, wherein said first transformation method comprises a compression algorithm and wherein a parameter of the compression algorithm varies between said first transformation method and optionally further transformation methods.

8. The method according to claim 1, wherein said one or more digital content items with transformation assessment results within a similar range belong to a similar group.

9. The method according to claim 4, wherein the first transformation assessment result and the second transformation assessment result for said one or more digital content items are used in combination to determine a group for said one or more digital content items.

10. The method according to claim 1, wherein the at least one characteristic is a file size.

11. The method according to claim 10, wherein the assessing is calculating a ratio between a file size of the one or more transformed digital content items and a file size of the one or more digital content items.

12. A method for determining an origin of one or more digital content items, the method comprising:
retrieving one digital content item from the one or more digital content items;
determining at least one characteristic of the retrieved digital content item;
transforming only the retrieved digital content item to form a transformed digital content item using a first transformation method;
determining at least one characteristic of the transformed digital content item;
assessing said determined at least one characteristic of the one retrieved digital content item with respect to at least one characteristic of the transformed digital content item to form a first transformation assessment result;
using said first transformation assessment result to determine and identify an origin of the one retrieved digital content item by comparing the first transformation assessment result to a transformation assessment result of a digital content item of a known origin obtained using the first transformation method;
creating a table containing a first transformation assessment;
outputting to a display or to a printer a first transformation assessment result.

13. The method according to claim 12, wherein the first transformation is non-compressing, and comparing said first transformation assessment result to the transformation assessment result of the digital content item of the known origin comprises comparing a second and optionally further transformation assessment result of the retrieved digital content item to a second and optionally further transformation assessment result of the digital content item of the known origin obtained using a second and optionally further transformation method.

14. The method according to claim 12, wherein the retrieved digital content item is a form of text.

15. The method according to claim 12, wherein the retrieved digital content item is a form of software.

16. The method according to claim 12, wherein at least one step of the method is implemented using a Field Programmable Gate Array or an Application Specific Integrated Circuit.

17. A system for determining an origin of a digital content item, the system comprising:
a hardware processor configured to execute non-transitory machine readable instructions for determining a transformation assessment result of a first digital content item and a corresponding origin of said first digital content item;
a first hardware storage for storing the transformation assessment result of said first digital content item and the corresponding origin of said first digital content item;
a hardware device for uploading a second digital content item to a service for determining a transformation assessment result of said second digital content item and wherein the hardware processor is configured to determine a relationship between said transformation assessment result with the transformation assessment result of said second digital content item to determine an origin of said second digital content item; and wherein the hardware processor is further configured to identify and present a similarity between the origin of the first digital content item and the origin of the second digital content item, and wherein the hardware processor is further configured to create a able containing the transformation assessment result, and wherein the hardware processor is further configured to output to a display or to a printer the first transformation assessment result.

18. A method for grouping files comprising text, the method comprising:

retrieving one or more files comprising text;

transforming, using a transforming program, said one or more files comprising text to form one or more transformed files;

storing said one or more transformed files;

extracting one or more file ratios of said stored one or more transformed files from metadata of said stored one or more transformed files;

storing said one or more file ratios of said stored one or more transformed files;

using said stored one or more file ratios to establish a group of said one or more files comprising text based on a statistical similarity of the stored one or more file ratios of said stored one or more transformed files;

creating a table containing a file ratio of a transformed file;

outputting to a display or to a printer a file ratio of a transformed file.

19. The method according to claim 18, wherein the method uses a non-compressing transforming, and the method further comprises determining which of said one or more files comprising text should be transformed.

20. The method according to claim 18, wherein the method is used for said stored group of said one or more files comprising text of one or more known origins and said one or more ratios of said transformed files are related to said one or more known origins.

21. The method according to claim 18, wherein the transforming is done using a second transformation program different from a first transformation program for transforming said one or more files comprising text to form one or more second stored ratios of transformed files from said one or more files comprising text.

22. The method according to claim 21, wherein the transforming is done using a third transformation program and optionally further transformation program different from the first transformation program and the second transformation program for transforming said one or more files comprising text, to form a third stored ratios of transformed files and optionally further stored ratios of transformed files from said one or more files comprising text.

23. The method according to claim 20, wherein the transforming comprises transforming said one or more files comprising text with a compression algorithm.

24. The method according to claim 23, wherein a parameter of said compression algorithm varies between a first compression and optionally further compressions.

25. The method according to claim 20, wherein said one or more files comprising text with the stored one or more ratios of transformed files are within a predetermined range belong to a same stored group.

26. The method according to claim 20, wherein the stored one or more ratios of transformed files for said one or more files comprising text are used in combination to determine said stored group for said one or more files comprising text.

27. A method for determining an origin of one file, the method comprising:

retrieving one file comprising text;

transforming, using a first transformation method, said one file comprising text to form one transformed file;

determining at least one characteristic of said one transformed file;

assessing said determined at least one characteristic of said one transformed file with a respective at least one characteristic of said one file comprising text to form one first transformation assessment result;

using said one first transformation assessment result to determine and identify an origin of said one file comprising text by comparing said one first transformation assessment result of said one file comprising text to one second transformation assessment result of one file of known origin, said one second transformation assessment result obtained using said first transformation method;

creating a table containing a transformation assessment results;

outputting to a display or to a printer a transformation assessment result.

28. The method according to claim 27, wherein comparing said first transformation assessment result of the one file comprising text to the second transformation assessment result of the one file of known origin comprises comparing one second transformation assessment result and optionally further transformation assessment result of said file comprising text to a second transformation assessment result and optionally further one transformation assessment result of said file of known origin obtained using the second transformation method and optionally further transformation method.

29. The method according to claim 27, wherein the one file comprising text is a form of software code, and the first transformation method is non-compressing.

30. A system for determining an origin of a file comprising text, the system comprising:

a first hardware storage for storing one or more compressed file ratios of said first file comprising text and corresponding at least one identified origin of said first file comprising text; and a hardware processor for causing a hardware device to upload one or more second files comprising text to a service for determining one or more stored compressed file ratios of said one or more second files comprising text and determining a relationship between said one or more stored compressed file ratios of said one or more second files comprising text with the one or more stored compressed file ratios of said first file to determine an origin of said one or more second files comprising text; and wherein the hardware processor is further configured to identify and present a similarity between the origin of the first file and the origin of the one or more second files comprising text.

31. A system for grouping files comprising text, the system comprising a processor configured to execute non-transitory machine readable instructions, wherein execution of the non-transitory machine readable instructions by the processor is configured to cause the system to:

retrieve, using means for retrieving, one or more files comprising text;

transform, using means for transforming, said one or more files comprising text to form one or more transformed files;

store, using means for storing, said one or more transformed files;

extract, using means for extracting, one or more ratios of transformed files of said stored one or more transformed files from metadata of said stored one or more transformed files;

store, using the means for storing said one or more ratios of transformed files;

establish and store, using said stored one or more ratios of transformed files, a group of said one or more files comprising text based on a statistical similarity of the stored one or more ratios of transformed files;

create a table containing a ratio of transformed files;

output to a display or to a printer a ratio of transformed files.

32. The system according to claim 31, wherein the means for transforming said one or more files comprising text is non-compressing and further comprises means for determining which of said one or more files comprising text should be transformed.

33. The system according to claim 31, wherein means for transforming said one or more files comprising text comprises a second transformation different from a first transformation for said one or more files comprising text, to form one or more second stored ratios of transformed files from said one or more files comprising text.

34. The system according to claim 33, wherein means for transforming said one or more files comprising text comprises a third and optionally further transformation different from the first and second transformation for said one or more files comprising text, to form a third and optionally further stored ratios of transformed files from said one or more files comprising text.

35. The system according to claim 33, wherein the second transformation of said one or more files comprising text comprises a compression algorithm.

36. The system according to claim 35, wherein a parameter of said transformation algorithm varies between said first transformation and optionally further transformations.

37. The system according to claim 31, wherein said one or more files comprising text with the stored one or more ratios of transformed files are within a predetermined range belong to said same stored group of the one or more files comprising text.

38. The system according to claim 31, wherein the stored one or more ratios of transformed files for said stored one or more transformed files are used in combination to determine said stored group for said one or more files comprising text.

39. A system for determining an origin of one file, the system comprising a processor configured to execute non-transitory machine readable instructions, wherein execution of the non-transitory machine readable instructions by the processor is configured to cause the system to:

retrieve, using means for retrieving, one file;

transform, using means for transforming, said one file to form one transformed file;

determine, using means for determining, at least one characteristic of said one transformed file;

assessing, using means for assessing, said determined at least one characteristic of said one transformed file with respect to at least one characteristic of said one file to form one first transformation assessment result;

determine, using said one first transformation assessment result, an origin of said one file by comparing said one first transformation assessment result to one second transformation assessment result of one file of known origin, said one second transformation assessment result obtained using a first transformation means; and identify an author of the one file based on the determined origin; and create a table containing a first transformation assessment result; and output to a display or to a printer a first transformation assessment result.

40. The system according to claim 39, wherein means for assessing comprises assessing one second and optionally further transformed file comprising text to one second and optionally further transformed file of the one file of known origin obtained using a second and optionally further transformation means.

41. The system according to claim 40, wherein the means for transforming is non-compressing, and the one file is a form of software code.

42. A system for determining an origin of a file comprising text, the system comprising a processor configured to execute non-transitory machine readable instructions, wherein execution of the non-transitory machine readable instructions by the processor is configured to cause the system to:

store, in a first storage means, one or more compressed file ratios of a first file comprising text and a corresponding at least one identified origin of said first file comprising text;

upload, in a means for uploading, one or more second files comprising text to a service;

determine one or more stored compressed file ratios of said one or more second files comprising text;

determine a relationship between said one or more stored compressed file ratios of said one or more second files comprising text by using the stored compressed file ratios of said first files comprising text to determine an origin of said one or more second files comprising text.

43. A method for grouping videos, the method comprising:

retrieving one or more videos;

converting said retrieved one or more videos to form one or more converted videos;

storing said one or more converted videos;

extracting one or more ratios of converted video of said stored one or more converted videos from metadata of said stored one or more converted videos;

storing said extracted one or more ratios of converted videos;

using said stored extracted one or more ratios of converted videos to establish and store a group of similar one or more videos based on a statistical similarity of the stored extracted one or more ratios of converted video;

creating a table containing a ratio of converted videos;

outputting to a display or to a printer a ratio of converted videos.

44. The method according to claim 43, wherein the method further comprises determining which of said retrieved one or more videos should be converted.

45. The method according to claim 43, wherein said extracted one or more ratios of converted video are related to one or more videos of known origin.

46. The method according to claim 45, wherein the converting of the retrieved one or more video is done using a second conversion different from a first conversion used to convert said retrieved video, to form one or more second stored ratios of converted video from said one or more converted video.

47. The method according to claim 46, wherein converting the retrieved one or more video is done using a third and optionally further conversion different from the first conversion and the second conversion for said retrieved one or more video, to form a third and optionally further stored ratios of converted video from said retrieved one or more video.

48. The method according to claim 43, wherein the converting the retrieved one or more video comprises converting said retrieved one or more video with a conversion algorithm.

49. The method according to claim 48, wherein said conversion algorithm is non-compressing and a parameter of the conversion algorithm varies between a first and optionally further conversions.

50. The method according to claim 43, wherein said stored extracted one or more ratios of converted video are within a predetermined range belong to said same stored group.

51. The method according to claim 43, wherein the said stored extracted one or more ratios of converted video of said one or more converted video are used in combination to determine said stored group of said retrieved video.

52. A method for determining an origin of one video, the method comprising:

retrieving one video;

transforming, using a first transformation method, said one video to form one transformed video;

determining at least one characteristic of said one transformed video;

assessing said determined at least one characteristic of said one transformed video with a respective at least one characteristic of said one video to form one first transformation assessment result;

using said one first transformation assessment result to determine an origin of said one video by comparing said first transformation assessment result to one second transformation assessment result of one video of known origin, said one second transformation assessment result obtained using said first transformation method; and identifying the determined origin of the one video; and creating a table containing a transformation assessment result; and outputting to a display or to a printer a transformation assessment result.

53. The method according to claim 52, wherein comparing said first transformation assessment result(s) to the one second transformation assessment result of the one video of known origin comprises comparing one second and optionally further transformation assessment result of said one transformed videos to a second and optionally further one transformation assessment result of said one video of known origin obtained using a second and optionally further transformation.

54. A system for determining an origin of a video, the system comprising a processor configured to execute non-transitory machine readable instructions, wherein execution of the non-transitory machine readable instructions by the processor is configured to cause the system to:

store, in a first hardware storage, one or more ratios of converted video of a first video and a corresponding at least one identified origin of said first video;

upload, using a hardware device for uploading, one or more second videos to a service for determining one or more stored ratios of converted video of said one or more second videos and determining a relationship between said stored one or more ratios of converted video with the stored one or more ratios converted video of said first video to determine an origin of said one or more second videos;

create a table containing a ratio of a converted video; and output to a display or to a printer a ratio of a converted video.

55. A system for determining an origin of an audio file, the system comprising at least one processor and a memory, the at least one processor configured to execute non-transitory machine-readable instructions, wherein execution of the non-transitory machine-readable instructions by the processor is configured to cause the system to:

retrieve one audio file;

transform, using a transformation method, said retrieved audio file to form one transformed audio file;

determine at least one characteristic of said one transformed audio file;

assess said determined at least one characteristic of said one transformed audio file with a respective at least one characteristic of said one retrieved audio file to form one audio transformation assessment result;

transform, one audio file of known origin to form one transformed audio file of known origin;

assess said determined at least one characteristic of said one transformed audio file with a respective at least one characteristic of said one audio file of known origin to form one known origin audio transformation assessment result;

use said one known audio transformation assessment result to determine an origin of said retrieved one audio file by comparing said one audio transformation assessment result of said one audio file to one known origin transformation assessment result of one audio file of known origin;

create a table containing a ratio of an audio transformation assessment result;

output to a display or to an audio transformation assessment result.

56. A method for grouping images, the method comprising:

retrieving one or more images;

converting said retrieved one or more images, using a first conversion, to form one or more converted images;

storing said one or more converted images;

extracting one or more ratios of first converted images of said stored one or more converted images from metadata of said stored one or more converted images;

storing said one or more ratios of first converted images;

using said stored one or more ratios of first converted images to establish a group of said retrieved images based on a statistical similarity of the stored one or more ratios of first converted images;

creating a table containing a ratio of converted images;

outputting to a display or to a printer a ratio of converted images.

57. The method according to claim 56, wherein the method further comprises determining which of said retrieved images should be converted.

58. The method according to claim 56, wherein the method is used for said stored group of said one or more retrieved images and said one or more converted images ratios are related to one or more images of known origin.

59. The method according to claim 58, wherein converting said one or more retrieved images is done using a second conversion different from a first conversion for converting said one or more retrieved images, to form one or more stored second converted images ratios from said one or more converted images.

60. The method according to claim 59, wherein converting the retrieved images is done using a third and optionally further non-compressing conversion different from the first and second conversion for said one or more retrieved images, to form a third and optionally further stored third converted images ratios from said images.

61. The method according to claim 56, wherein the converting of the retrieved one or more images comprises converting said retrieved images with a conversion algorithm.

62. The method according to claim 61, wherein a parameter of said conversion algorithm varies between said first and optionally further conversions.

63. The method according to claim 62, wherein said one or more converted images and stored one or more ratios of first converted images that are within a predetermined range are identified as belonging to a same stored group of retrieved images.

64. The method according to claim 63, wherein the said stored one or more ratios of first converted images for said one or more converted images are used in combination to determine said stored group.

65. A method for determining an origin of one image, the method comprising:

retrieving one image;

transforming, using a first transformation method, said one image to form one transformed image;

determining at least one characteristic of said one transformed image;

assessing said determined at least one characteristic of said one transformed image with a respective at least one characteristic of said one retrieved image to form one first transformation assessment result;

using said one first transformation assessment result to determine an origin of said one retrieved image by comparing said one first transformation assessment result to one second transformation assessment result of one image of a known origin, said one second transformation assessment result being obtained using said first transformation method creating table containing a transformation assessment result;

outputting a display or to a printer a transformation assessment result.

66. The method according to claim 65, wherein comparing said one first transformation assessment result to the one second transformation assessment result comprises comparing one second and optionally further transformation assessment result of said one transformed image to a second and optionally further one transformation assessment result of said one image of known origin obtained using the second and optionally further non-compressing transformation.

67. A system for determining an origin of an image, the system comprising a processor configured to execute non-transitory machine readable instructions, wherein execution of the non-transitory machine readable instructions by the processor is configured to cause the system to:

convert in a converter one first image;

determine a ratio of the converted first image from the one first image;

store in a first hardware storage the ratio of the converted image of said one first image and corresponding at least one identified origin of said one first image;

upload, using a hardware device for uploading, one or more second images to a service for determining one or more stored ratios of the converted images of said one or more second images and determining a relationship between said stored one or more ratios of the converted images of the one or more second images with the stored ratio of the converted image of said first image to determine and identify an origin of said one or more second images;

create a table containing a ratio of a converted image;

output to a display or to a printer a ratio of a converted image.

68. The system of claim 67, wherein the first image is converted using a histogram.

69. The system of claim 67 wherein the first image is converted using a standard of the Joint Photographic Experts Group.

70. The system of claim 67, wherein the first image is converted in a lossless manner.

71. The system of claim 67 wherein the first image is converted in a lossy manner.

* * * * *